April 23, 1963     O. P. DALE     3,086,621

SPEED CONTROL DEVICE WITH ASSOCIATED BRAKE

Filed Nov. 20, 1959     2 Sheets-Sheet 1

INVENTOR

O. Pierce Dale

BY *Moore & Hall*

ATTORNEYS

April 23, 1963 O. P. DALE 3,086,621
SPEED CONTROL DEVICE WITH ASSOCIATED BRAKE
Filed Nov. 20, 1959 2 Sheets-Sheet 2
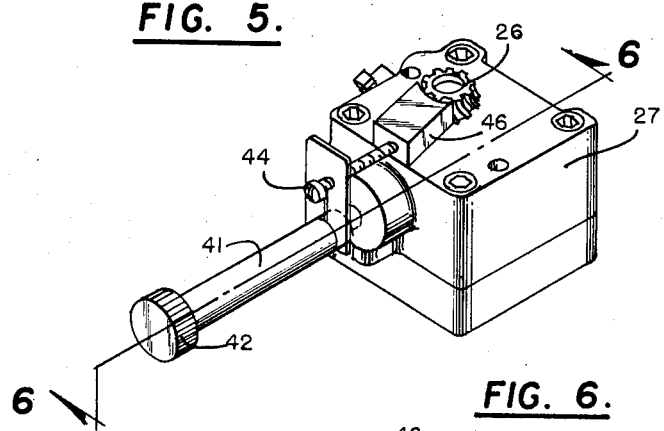
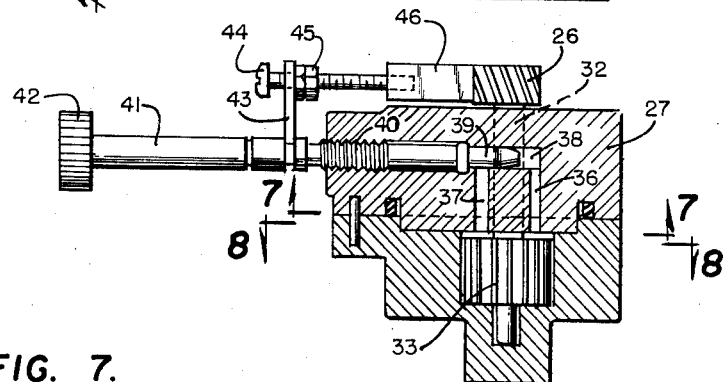
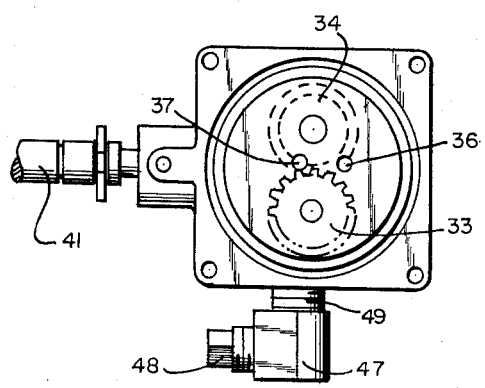
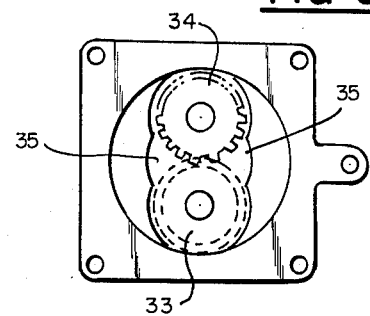
INVENTOR
O. Pierce Dale
BY Moore & Hall
ATTORNEYS United States Patent Office 3,086,621
Patented Apr. 23, 1963

3,086,621
SPEED CONTROL DEVICE WITH ASSOCIATED BRAKE
Ozro P. Dale, 43 Pomona, Long Beach, Calif.
Filed Nov. 20, 1959, Ser. No. 854,466
3 Claims. (Cl. 188—86)

This invention relates to a speed control device with an associated brake, and more particularly to a device for controlling the rate of speed of a mechanism, which device has a brake for stopping the operation of the mechanism at any given position of the mechanism.

While the invention is one of general utility, it is shown in connection with the lowering of a casket. Such lowering devices for caskets have in the past employed a governor or manual winch type of control, and as a general rule only one lowering speed has been available. Moreover, the downward motion of the casket has been jerky. Prior devices also frequently got out of order. Repairs were complicated and difficult, usually requiring the purchase of replacement parts at a high price.

It is the object of this invention to provide a device of general utility for controlling the rate of motion of any suitable object, such as a casket, and to provide as part of the device a positive brake for stopping the motion at any suitable point.

Another object of the invention is to provide a speed controlling device and an associated brake which is simple and reliable in operation as well as low in cost.

Another object of the invention is to provide a speed controlling device with associated brake which has smooth operation, thereby avoiding the jerky motion of prior devices. In carrying out the foregoing object, the downward motion of the container in my device drives an oil pump of a special type, namely a gear pump which pumps oil around a closed path. The gears of this pump are driven by the apparatus whose speed is to be controlled, and a valve located in the aforesaid closed path determines the rate of flow of oil and hence the speed of said apparatus. The valve stem carries with it an adjustable brake shoe which at one end of the travel of the valve stops the shaft of the gear pump entirely. As a result, a smooth control from zero to any given velocity is possible. In addition, this device is simple and reliable in operation thereby avoiding the difficulties in the prior art which required frequent repairs.

Other objects, advantages and details of this invention will appear as this description proceeds.

In the drawings:

FIGURE 5 is a perspective view of the gear pump device.

FIGURE 6 is a cross-sectional view of the gear pump.

FIGURE 7 is a cross-sectional view taken along lines 7—7 of FIGURE 6.

FIGURE 8 is a cross-sectional view taken along lines 8—8 of FIGURE 6.

Figure 1:
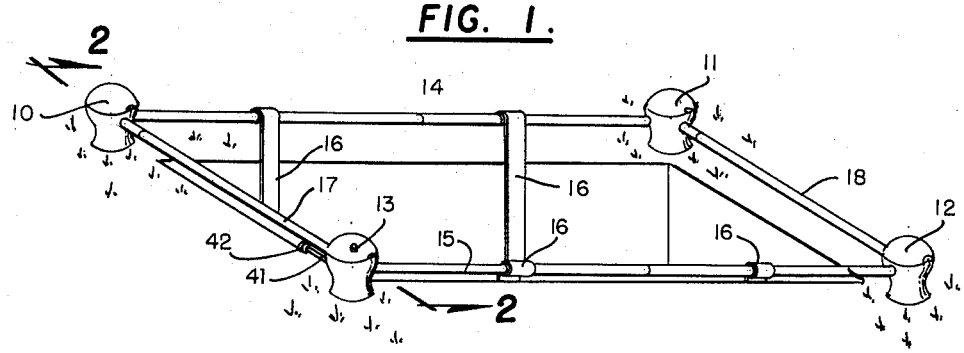
FIGURE 1 is a perspective view of a container lowering device embodying my invention, although this view shows mainly those features which are conventional.
Figure 2:
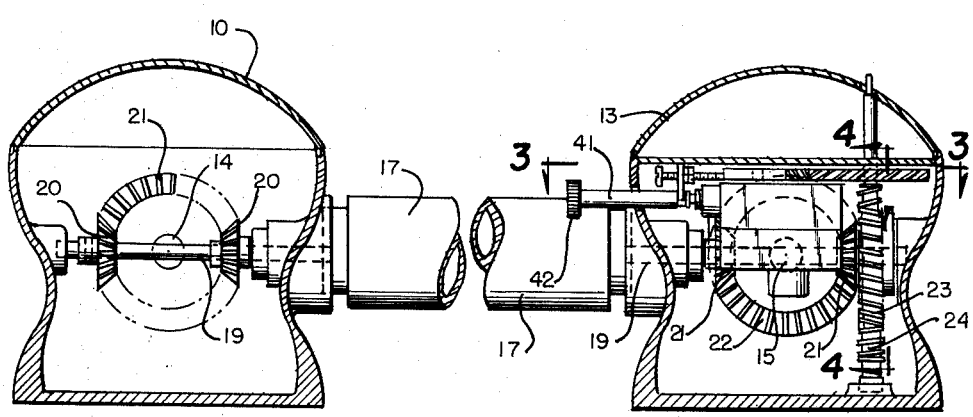
FIGURE 2 is a cross-sectional view of a portion of the casket lowering device of FIGURE 1.
Figure 3:
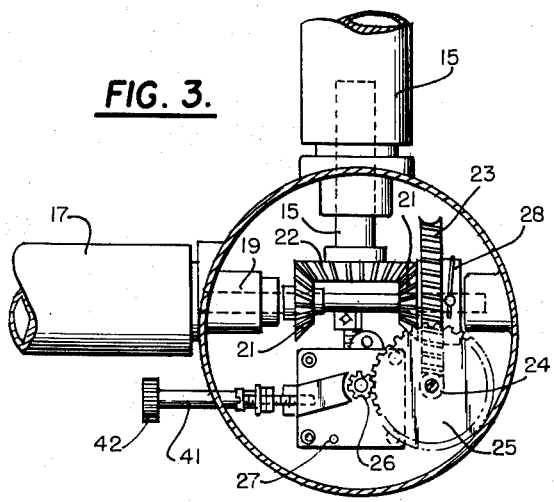
FIGURE 3 is a cross-sectional view taken along line 3—3 of FIGURE 2.

A conventional casket lowering device employs four corner elements 10, 11, 12 and 13, the first three of which are shown in entirely conventional form but the fourth, namely element 13, is shown with my improved speed control and associated brake therein. In conventional manner the elements 10 and 11 support rod 14, and likewise in conventional manner the elements 12 and 13 support rod 15. Mounted on these rods are straps 16 which are attached to the casket at their lower ends. Since these straps are wrapped around the shafts 14 and 15 a plurality of times, the weight of the casket tends to rotate rods 14 and 15. As will hereinafter appear, my invention controls the angular velocity of the rods 14 and 15, and thereby determines the time and speed at which the casket may be lowered. With reference to FIGURE 2, it is apparent that the rod 14 is rigidly connected to a gear wheel 21 which meshes with gears 20 on shaft 19. This shaft passes through the center of tube 17 (the tube 17 itself not being rotatable). Shaft 19 extends into casing 13 and connects to my mechanism in a way that will hereinafter appear, whereby to control the rotation of shaft 14 and thus limit or stop the downward motion of the casket. Rod or shaft 15 (FIGURE 1) also extends into casing 13 and is rigidly connected to a gear wheel 22 which meshes with gears 21 on the aforesaid shaft 19. In other words, the shafts 14 and 15 are interconnected by positive gearing and both must therefore rotate at the same speed at all times. As appears in FIGURE 4, an element 28 may rotate (except for pins 30 hereinafter mentioned) freely upon shaft 19, it not being directly connected to the shaft. However, it is pinned or otherwise rigidly connected to gear wheel 23 as will hereinafter appear. Shaft 19 has a notch 31 of the shape of a sawtooth therein whereby the shaft 19 may rotate counterclockwise without rotating the element 28, whereas clockwise rotation of the shaft 19 will rotate element 28 with the shaft. The pins 30 are mounted on springs 29 and are forced against the shaft 19 so that one of the pins quickly drops into sawtooth indent 31 when the shaft begins to rotate clockwise and thus moves the element 28 with the shaft.

Figure 4:
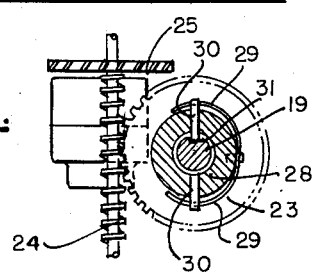
FIGURE 4 is a cross-sectional view taken along line 4—4 of FIGURE 2.

The reason why element 28 is arranged to rotate when the shaft 19 rotates in one direction but not when the shaft rotates in the other direction is that when it is desired to raise the casket, or to wind up the strap 16 on the shafts 14 and 15, one of these two shafts is turned manually in the proper direction to wind the strap 16 onto the shaft and when turned in this direction it is undesirable and unnecessary for my control device to be in action. In other words, the shafts 14 and 15 rotate in that angular direction, which is the counterclockwise direction of shaft 19 as shown in FIGURE 4 without my control device controlling them. In that case the element 28 is not rotated by the shaft 19, whereby my mechanism is out of action.

However, when the casket is lowered and the shafts 14 and 15 are rotated thereby, the shaft 19 rotates clockwise and in this case one of the pins 30 quickly engages the sawtooth indent 31 and rotates the element 28 along with the gear wheel 23. Gear 23 meshes with the worm gear 24 which is directly connected to gear 25 and in turn meshes with gear 26 which is mounted on casing 27 containing the gear pump as will hereinafter appear.

It follows from the foregoing that if the gear pump is permanently braked or if its motion is retarded the downward motion of the casket will likewise be braked or retarded as the case may be. Consequently, as will hereinafter appear, my invention includes means for controlling the rotation of gear 26 to thereby control the downward motion of the casket.

The gear pump is enclosed in casing 27. The gear 26 is connected by a shaft 32 to one of the wheels 33 of the gear pump. Gear wheel 33 meshes with gear wheel 34 and when 33 rotates clockwise wheel 34 rotates counterclockwise and the two together tend to pump the oil in cavity 35 up opening 36 (in the housing 27) into the cavity 38. A valve 39 when closed will prevent further movement of the oil. However, if the valve 39 is retracted by rotating shaft 41 by means of knurled head 42, whereby the threads 40 cause the valve 39 to move rearward, there is then a free path of oil flow up opening 36 into cavity 38 and returning through hole 37 to the cavity 35. When the valve 39 is thus open and free flow of oil is possible, the gear 26 does not substantially retard the downward movement of the casket. When the valve 39 is in its forward position whereby the flow of oil is completely retarded, a brake shoe 46 is pressed against the gear wheel 26 and provides a positive brake that prevents any lowering of the casket. The brake 46 is attached to the valve stem 41 by an adjustable connection including a vertical member 43 having a hole in its lower end through which the valve stem 41 passes and may freely rotate therein. Member 43 has a threaded hole in its upper end through which the threads of bolt 44 pass and after the correct operating position of the bolt 44 has been selected, one or more nuts 45 are tightened against the member 43 to secure a rigid connection between members 43 and 44. The forward end of bolt 44 is connected to brake shoe 46.

In order to replenish the supply of oil in event it should become low, an oil inlet 47 having a removable inlet plug 48 is provided on one side wall of the device. It has a pipe 49 leading to the cavity 38.

To use the mechanism described above, the rods 14 and 15 are first rotated by hand until the straps 16 have the desired number of turns or wraps around the rods. This can be done even if the brake shoe 46 is in full braking position, as it probably would be. The casket is then supported by the straps but because of the very large step-up gear ratio between gear 23 and worm gear 24, the casket is held in place by the small brake 46. When the funeral services have reached the time that it is desired to lower the casket, the knurled head 42 (FIGURE 1) is rotated to retract valve 39. The more the head 42 is thus rotated, the less the impedance to the circulation of oil. The less impedance to the circulation of oil the less impedance to rotation of gear 25 will be offered by gear 26. In other words, the velocity of downward motion of the casket will depend on the position of head 42.

The foregoing arrangement enables a very smooth downward motion of the casket at any desired speed. Moreover, it is much more reliable than prior devices, in that repairs are not often needed.

I claim to have invented:

1. In a braking device, a gear type fluid pump having an input and an output, means defining an oil circulating path extending from the output of the pump to the input thereof, a rotatable valve for adjusting the amount of oil flow through said path, and means driven by said rotatable valve which positively stops the gear pump at that end of the travel of the valve which provides the greatest limitation on the flow of oil.

2. In a braking device, a gear type fluid pump having an inlet and an outlet, a housing enclosing said pump, said pump having a shaft passing through the housing and connected to the pump, means defining an oil circulating path extending from the outlet of the pump to the inlet thereof, a rotatable valve having a stem entering the housing perpendicular to the shaft of the pump, a braking wheel mounted outside the housing on the shaft of the pump, and a brake operated by the valve stem for engaging the brake wheel when the valve is closed, to thereby prevent rotation of the pump and said shaft.

3. A fluid braking element comprising a housing, a gear pump in the housing having a shaft extending outside the housing, said pump having an inlet and an outlet, a brake wheel on the shaft outside the housing, means defining an oil circulating path extending from the outlet of the pump to the inlet thereof, a valve having a stem entering the housing in a plane perpendicular to that of said shaft, said valve having a plunger entering the oil circulating path for controlling the amount of oil flow through said path, and a braking device carried by the valve stem for engaging said brake wheel when the valve is moved to that end of travel which provides maximum restriction of the flow of oil.

References Cited in the file of this patent

UNITED STATES PATENTS

| | | |
|---|---|---|
| 1,004,430 | Hoslet et al. | Sept. 26, 1911 |
| 1,109,538 | Miller | Sept. 1, 1914 |
| 2,106,493 | Byers | Jan. 25, 1938 |
| 2,560,450 | Kaiser | July 10, 1951 |
| 2,786,553 | Boone et al. | Mar. 26, 1957 |
| 2,845,149 | Stern et al. | July 29, 1958 |